(12) United States Patent
Dessart

(10) Patent No.: US 10,391,580 B2
(45) Date of Patent: Aug. 27, 2019

(54) INTEGRATED CABLE MANAGEMENT SYSTEM AND APPARATUS

(71) Applicant: Illinois Tool Works Inc., Glenview, IL (US)

(72) Inventor: Nicholas James Dessart, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 856 days.

(21) Appl. No.: 14/570,844

(22) Filed: Dec. 15, 2014

(65) Prior Publication Data

US 2016/0167155 A1 Jun. 16, 2016

(51) Int. Cl.
| | |
|---|---|
| *B23K 9/32* | (2006.01) |
| *F16L 3/06* | (2006.01) |
| *B65H 75/36* | (2006.01) |
| *B23K 9/10* | (2006.01) |

(52) U.S. Cl.
CPC .............. *B23K 9/32* (2013.01); *B23K 9/1006* (2013.01); *B65H 75/366* (2013.01); *F16L 3/06* (2013.01); *B65H 2701/34* (2013.01)

(58) Field of Classification Search
CPC ...... B23K 9/32; B23K 9/1006; B23H 75/366; B23H 2701/34; F16L 3/06
See application file for complete search history.

(56) References Cited

U.S. PATENT DOCUMENTS

| | | | |
|---|---|---|---|
| 1,754,162 A | 4/1930 | Colegrove | |
| 2,193,989 A | 3/1940 | Smellie | |
| 6,396,019 B1 * | 5/2002 | Williams | B23K 9/32 206/723 |
| D662,473 S * | 6/2012 | Andre | D13/110 |
| 2002/0096411 A1 | 7/2002 | Tsuji et al. | |
| 2005/0258155 A1 * | 11/2005 | DeYoung | B23K 9/32 219/130.1 |
| 2015/0021305 A1 * | 1/2015 | Rozmarynowski | B23K 9/1043 219/130.1 |

FOREIGN PATENT DOCUMENTS

| | | |
|---|---|---|
| CN | 2156980 Y | 2/1994 |
| CN | 2592324 Y | 12/2003 |
| CN | 1529808 A | 9/2004 |
| CN | 2882538 Y | 3/2007 |
| CN | 203794366 U | 8/2014 |

OTHER PUBLICATIONS

PCT International Search Report and Written Opinion issued in connection with related PCT Application No. PCTUS2015/059640 dated Feb. 2, 2016.
Miller, Millermatic 252, Issued Apr. 2013, Index. No. DC/12.49.

* cited by examiner

*Primary Examiner* — Brian W Jennison
(74) *Attorney, Agent, or Firm* — McAndrews, Held & Malloy, Ltd.

(57) ABSTRACT

A cable management system for a manufacturing apparatus. The cable management system includes a housing having a front panel and a rear panel and a recessed pocket integrated into at least one of the front panel and the rear panel. The cable management system further includes a cable management hook movably mounted to the recessed pocket and having a shape complementary to the recessed pocket so as to be configured to move between an open position external to a shape of the housing and a closed position that is integrated with the shape of the housing.

21 Claims, 6 Drawing Sheets

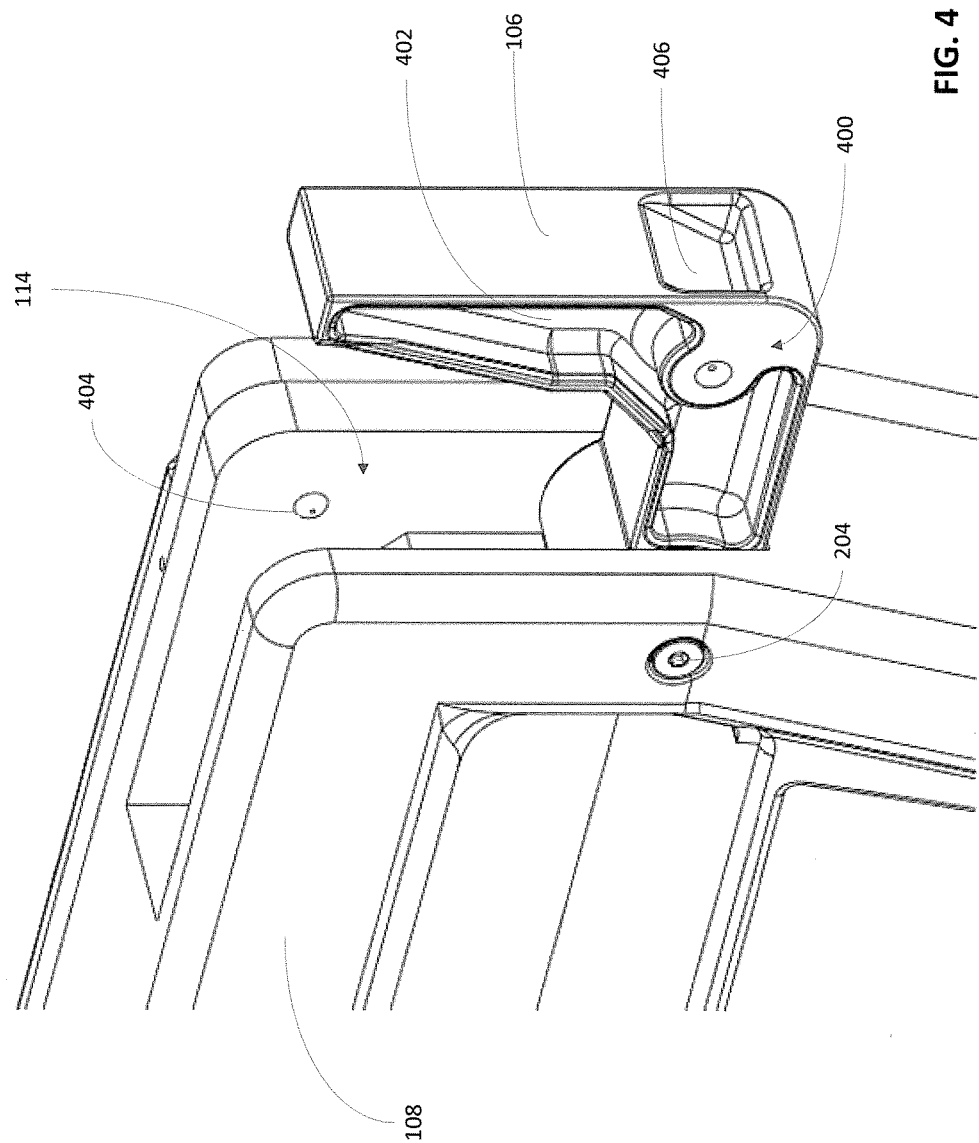

INTEGRATED CABLE MANAGEMENT SYSTEM AND APPARATUS

TECHNICAL FIELD

The present disclosure relates generally to cable management, and more specifically to an integrated cable management system for metal fabrication equipment.

BACKGROUND

Metal fabrication equipment, such as welding and cutting equipment, has multiple accessories, such as a welding gun and a grounding clamp, which are connected to the equipment enclosure via respective cables. Various other cables, for example a power supply cable, are also attached to the welding or cutting equipment enclosures. Therefore, cable management is needed to save valuable work space and ensure efficient operation of the equipment. However, existing cable management systems that are externally mounted to equipment enclosures only partially solve the above issues because they protrude from and add bulk to the equipment housing, thereby increasing weight and complicating portability of the associated equipment.

SUMMARY

Embodiments of the present disclosure provide a cable management system that is integrated into the housing of a metal fabrication apparatus. For instance, in one embodiment, a cable management system for a manufacturing apparatus is provided. The cable management system includes a housing having a front panel and a rear panel and a recessed pocket integrated into at least one of the front panel and the rear panel. The cable management system further includes a cable management hook movably mounted to the recessed pocket and having a shape complementary to the recessed pocket so as to be configured to move between an open position external to a shape of the housing and a closed position that is integrated with the shape of the housing.

In another embodiment, a welding apparatus is provided. The welding apparatus includes a housing having a front panel and a rear panel, as well as a cable having a first end and a second end, the cable being attached to the housing via the first end and having an accessory attached to the second end. The welding apparatus further includes a recessed pocket integrated into at least one of the front panel and the rear panel, as well as a cable management hook movably mounted to the recessed pocket and having a shape complementary to the recessed pocket so as to be configured to move between an open position external to a shape of the housing and a closed position that is integrated with the shape of the housing. The cable management hook is further configured to support the cable in the open position.

In an embodiment, the operator can choose which cable management hooks to utilize and pull them down as needed. To close the cable management hooks, the operator rotates them back toward the front or rear bezel and into the respective management pockets until they snap into place, which holds them from free falling open.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 4 is a block diagram illustrating the cable management hook of FIGS. 1A-1B in further detail, according to an embodiment.

DETAILED DESCRIPTION

Figures 1A, 1B:
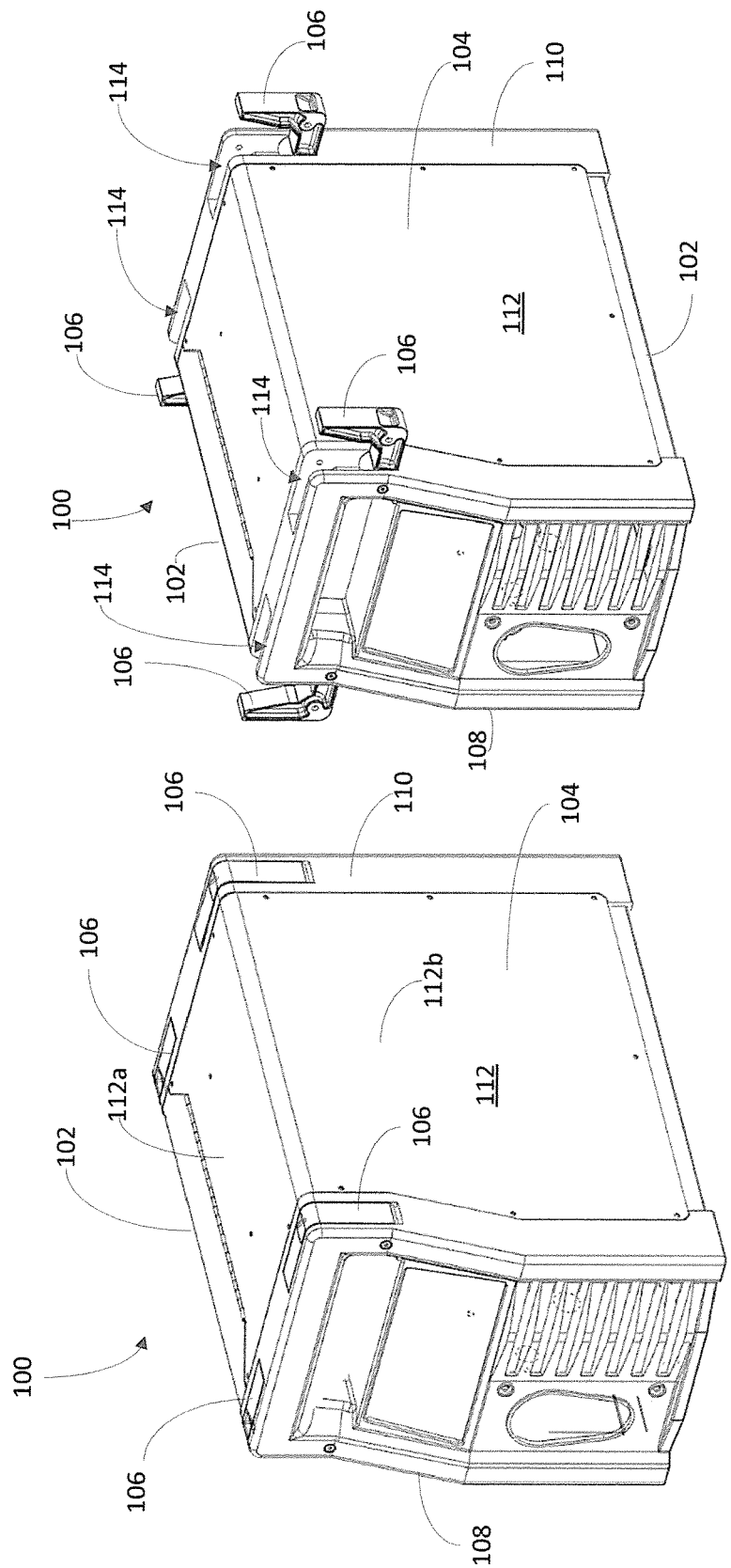
FIGS. 1A-1B are block diagrams illustrating an embodiment of a cable management system integrated into an enclosure of a welding apparatus.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Referring to FIGS. 1A-1B, an embodiment of a cable management system 100 integrated into an enclosure 102 of a welding apparatus 104 is shown. In accordance with the present disclosure, the cable management system 100 employs one or more cable management hooks 106 integrated into the apparatus enclosure 102 so as to avoid protruding from the enclosure 102 when not in use. In the illustrated embodiment, the enclosure 102 includes a front bezel 108, a rear bezel 110, and a multi-panel body 112 to which the front and rear bezels 108, 110 are fastened or otherwise fixedly coupled.

Figure 6B:
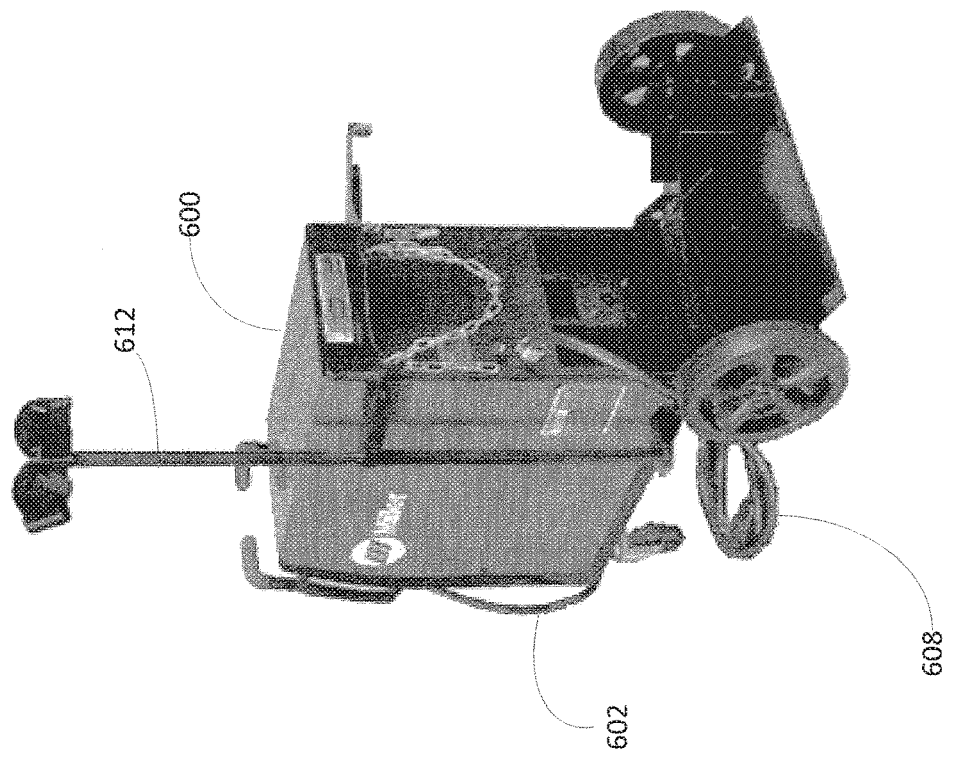
FIGS. 6A-6B are block diagrams illustrating a typical welding apparatus, according to an embodiment.
Figure 6A:
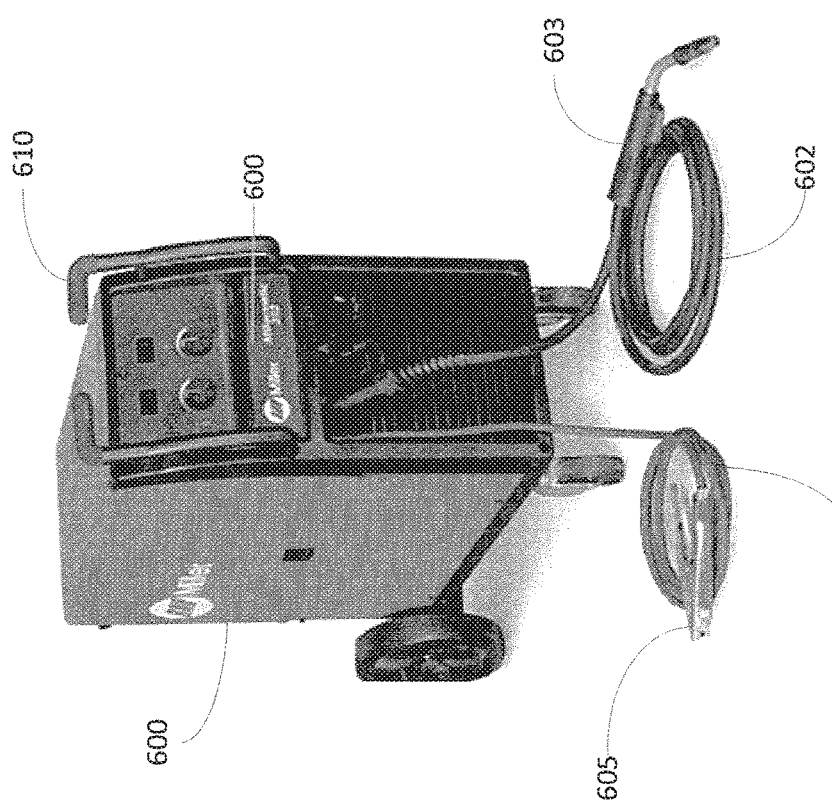

While FIGS. 1A, 1B depict a welding apparatus, additional embodiments include a different metal fabrication apparatus, such as a cutting apparatus, or another apparatus being configured for having attached thereto one or more cables. For instance, a typical welding apparatus 600, such as a Millermatic 252 that is available from Miller Electric Manufacturing Co., 1635 W Spencer St., Appleton, Wis. 54914, an embodiment of which is shown in FIGS. 6A-6B, may include a welding gun cable 602 for attaching a welding gun 603, a grounding clamp cable 604 for attaching a grounding clamp 605, a gas hose cable, a power supply cable 608, and one or more accessory cables typically needed in the course of a welding operation. However, the welding apparatus of FIGS. 6A-6B employs external handles 610 and/or a dedicated cable rack 612 for cable management, which protrude from the enclosure and add bulk. On the other hand, referring again to FIGS. 1A-1B, to streamline the profile of the welding apparatus in accordance with the present disclosure, the cable management hooks 106 of the embodiment of the welding apparatus enclosure 102 engage into L-shaped cavities defining the pockets 114 integrated into the front and rear panels having bezels 108, 110. In the illustrated embodiment, the cable management hooks 106 pivot about a pin or a bolt disposed in one of the end points of each pocket 114, as discussed in further detail below with respect to FIGS. 2, 3A, and 3B. Therefore, in use, when cable management is needed, the operator flips down one or more hooks 106 from their respective recessed pockets 114 in the front and/or rear bezel 108, 110. To close the cable management hooks 106, the operator rotates them back toward the front or rear bezel 108, 110 into the recessed hook pockets 114 until the hooks 106 snap into place. In addition to being used for hanging and managing cables, hooks 106 may be used to pull the welding apparatus enclosure 102 to or from the operator, such as when the enclosure 102 includes wheels or is configured to slide along a supporting work area surface.

While the illustrated embodiment depicts rectangular-shaped enclosure 102 and complementary L-shaped hooks 106 and L-shaped recess pockets 114, those skilled in the art will realize that the shape of the recess pockets and hooks may follow differently shaped enclosures so as to complement enclosure shape and fully integrate therein when not in use to avoid protrusion. For instance, in an alternate embodiment, the enclosure shape may be non-rectangular, such as having a rounded shape, and may have rounded corners. In this case, the recessed pockets and cable management hooks may have a generally arched shape so as to complement the shape of the apparatus enclosure. In various other embodiments, the recessed pockets and corresponding cable management hooks may be disposed at other locations throughout the apparatus enclosure. For instance, one or more recessed pockets 114 and hooks 106 may be integrated directly into a junction of a top surface 112a and a perpendicular side panel 112b of the multi-panel body 112 (in addition to or as an alternative to being integrated into the front and/or rear panels). While the illustrated embodiments depict four hooks (e.g., one at each corner of the enclosure), various embodiments may include a different number of integrated hooks 106, such as one or more hooks.

Figure 2:
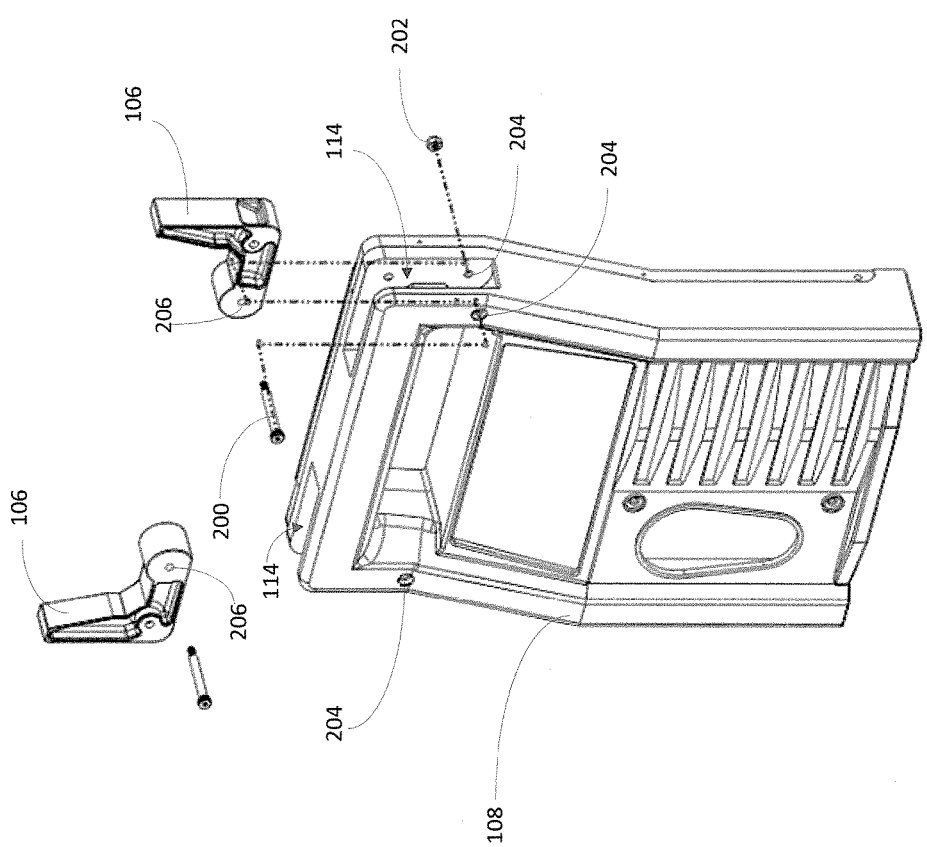
FIG. 2 is a block diagram illustrating a front bezel of the welding apparatus enclosure of FIGS. 1A-1B, according to an embodiment.
Figure 3:
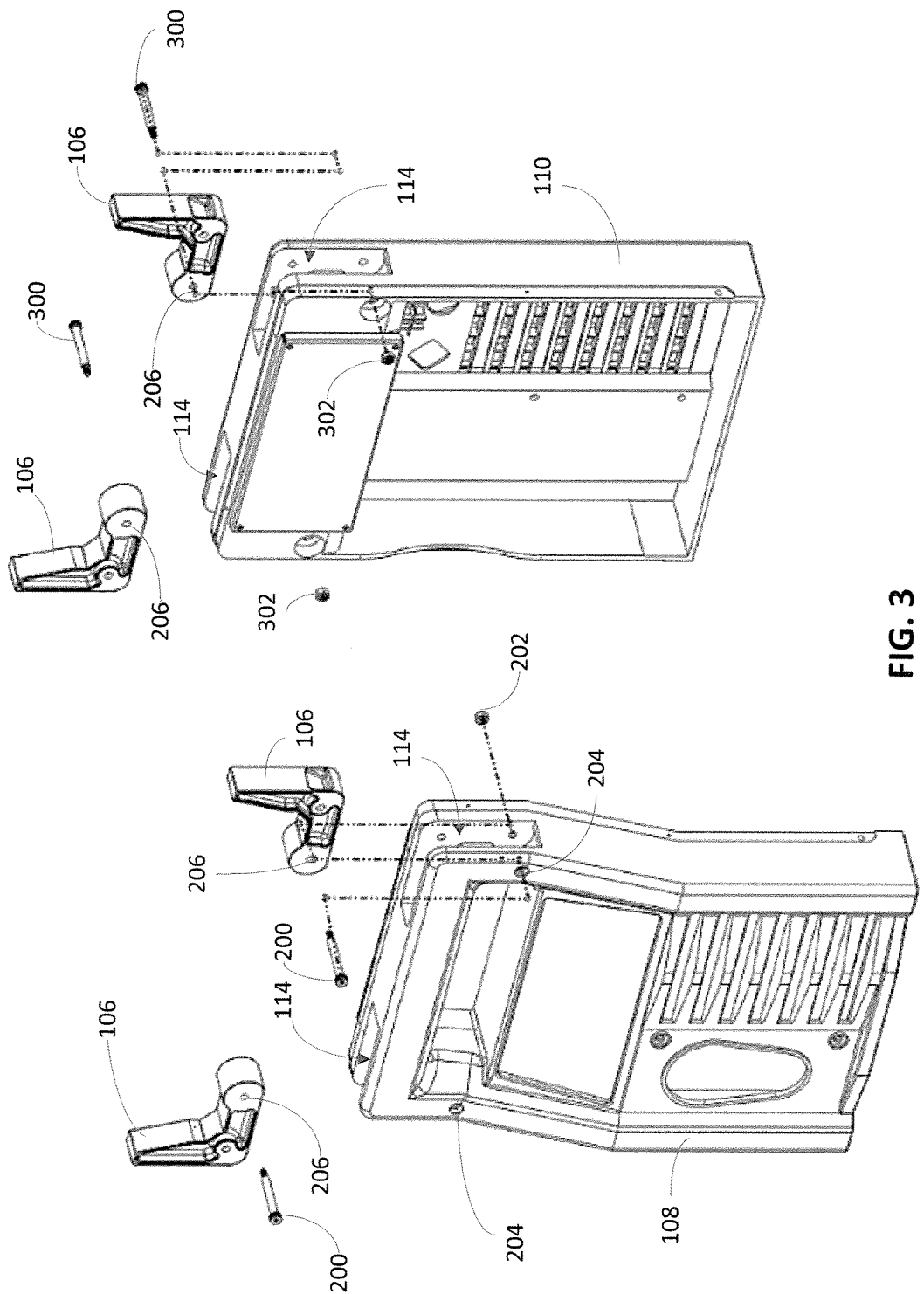
FIG. 3 is a block diagram illustrating a front bezel of FIG. 2 juxtaposed with a rear bezel of the welding apparatus enclosure of FIGS. 1A-1B, according to an embodiment.

Referring to FIG. 2, an embodiment of a front bezel 108 of the welding apparatus enclosure 102 is shown in greater detail. As illustrated in FIG. 2, cable management hooks 106 pivot in and out of the recessed pockets 114 by pivoting around a bolt 200 that connects the front bezel 108 to the hook 106 via respective openings 204, 206. The bolt 200 is fastened via a nut 202. FIG. 3 depicts the front bezel 108, described above in connection with FIG. 2, juxtaposed with the rear bezel 110. The rear bezel 110 similarly includes cable management hooks 106 that rotate in and out of the recessed pockets 114 via a bolt 300 fastened to the rear bezel 110 by a fastener, such as a nut 302. In another embodiment, the bolt-nut pivoting arrangement of FIGS. 2-3 may be replaced by a pin or another pivot member.

FIG. 4 depicts an embodiment of the cable management hook 106 having symmetrical side walls 400 that include a corresponding cavity 402 which interacts with a detent 404 for creating a snap-type connection between the cable management hook 106 and front or rear bezel 108, 110. In this embodiment, the cavity 402 may be located on both sides of the hook 106, such as when opposing sidewalls of the recessed pocket 114 each include one or more detents 404. In the illustrated embodiment, the cable management hook 106 also includes a finger cavity 406 that allows the user to pull the hook 106 out of the pocket 114 by snapping the cavity 402 away from the detent 404 as the hook 106 is pivoted out.

In alternate embodiments, the hooks 106 may stay inside the pockets 114 by way of a friction connection (e.g., due to tight tolerances), where the hooks either pivot in and out of the enclosure 102 or, in another embodiment, slide in and out (e.g., when the hooks are oriented as in FIG. 1B, but do not pivot and instead slide in and out of the recessed pockets that are oriented in parallel with the hooks). In yet another embodiment, the hooks stay inside the recessed pockets via a magnetic connection therebetween.

Figure 5A:
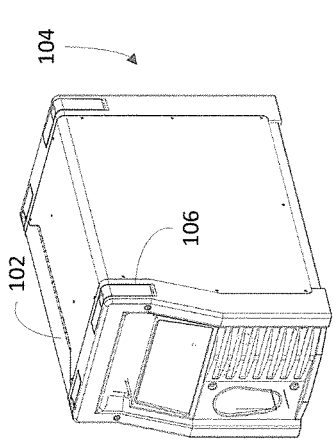
FIGS. 5A-5F are block diagrams illustrating various use cases of the cable management system of FIGS. 1A-1B, according to an embodiment.
Figure 5B:
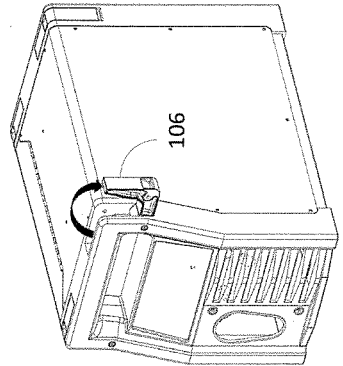
Figure 5C:
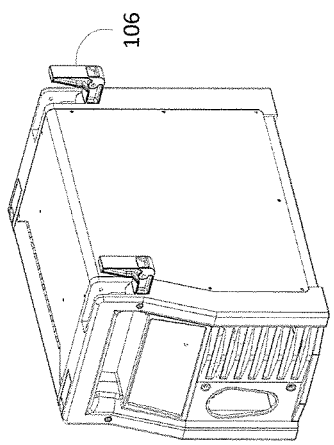
Figure 5D:
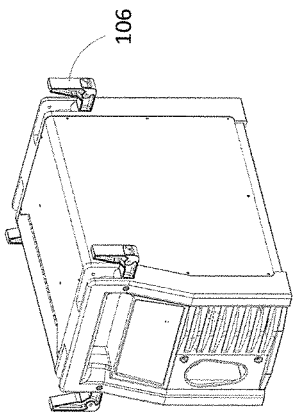
Figure 5E:
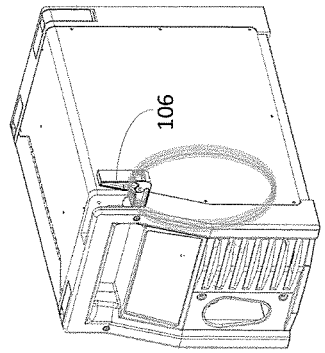
Figure 5F:
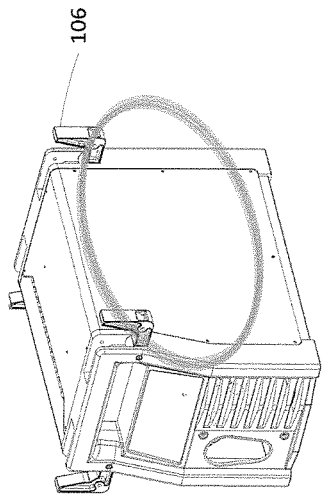

FIGS. 5A-5F illustrate various use cases for the cable management hooks 106. For instance, as shown in FIG. 5A, the cable management hooks 106 fully integrate with the shape of the welding apparatus enclosure 102 in their closed position. As shown in FIGS. 5B-5D, one or more hooks 106 may be independently pivoted out of the enclosure 102. As further depicted in FIGS. 5E-5F, depending upon the length and gauge of the accessory cables associated with the apparatus enclosure 102, one or more hooks on either side of the enclosure 102 are employed for hanging and otherwise managing the cables. As those skilled in the art will realize, the cable management hooks 106 may also be used to pull the enclosure 102, thereby reducing the need for additional enclosure handles and reducing the footprint of the welding or cutting machine 104.

While various aspects and embodiments have been disclosed, other aspects and embodiments are contemplated. The various aspects and embodiments disclosed are for purposes of illustration and are not intended to be limiting, with the true scope and spirit being indicated by the following claims.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown here but is to be accorded the widest scope consistent with the following claims and the principles and novel features disclosed herein.

What is claimed is:

1. A cable management system for a manufacturing apparatus comprising:
   a housing having a front panel and a rear panel;
   a first recessed pocket integrated into a front bezel of the front panel;
   a second recessed pocket integrated into a rear bezel of the rear panel;
   a first cable management hook movably mounted to the first recessed pocket and having a shape complementary to the first recessed pocket so as to be configured to move between an open position external to a shape of the front bezel and a closed position that is integrated with the shape of the front bezel; and
   a second cable management hook movably mounted to the second recessed pocket and having a shape complementary to the second recessed pocket so as to be configured to move between an open position external to a shape of the rear bezel and a closed position that is integrated with the shape of the rear bezel.

2. The cable management system of claim 1 wherein the manufacturing apparatus is a welding apparatus.

3. The cable management system of claim 1 wherein the manufacturing apparatus is a cutting apparatus.

4. The cable management system of claim 1 wherein the first and second cable management hooks pivot between the open and closed positions.

5. The cable management system of claim 4 wherein the first cable management hook pivots around a pivot member.

6. The cable management system of claim 5 wherein the pivot member is a bolt.

7. The cable management system of claim 5 wherein the pivot member is a pin.

8. The cable management system of claim 1 wherein the first and second cable management hooks remains in the closed position by way of snap-in connections with the first and second recessed pockets.

9. The cable management system of claim 8 wherein the snap-in connections include respective detents in the first and second recessed pockets cooperating with cavities in the first and second cable management hooks.

10. A welding apparatus comprising:
   a housing having a front panel and a rear panel;
   a cable having a first end and a second end, the cable being attached to the housing via the first end and having an accessory attached to the second end;
   a first recessed pocket integrated into a front bezel of the front panel;
   a second recessed pocket integrated into a rear bezel of the rear panel;
   a first cable management hook movably mounted to the first recessed pocket and having a shape complementary to the first recessed pocket so as to be configured to move between an open position external to a shape of the front bezel and a closed position that is integrated with the shape of the front bezel; and
   a second cable management hook movably mounted to the second recessed pocket and having a shape complementary to the second recessed pocket so as to be configured to move between an open position external to a shape of the rear bezel and a closed position that is integrated with the shape of the rear bezel, wherein,
   the first and second cable management hooks are further configured to support the cable in the open position.

11. The welding apparatus of claim 10 wherein the accessory is a welding gun.

12. The welding apparatus of claim 10 wherein the accessory is a grounding clamp.

13. The welding apparatus of claim 10 wherein the cable is a gas hose cable.

14. The welding apparatus of claim 10 wherein the cable is a power supply cable.

15. The welding apparatus of claim 10 wherein the first and second cable management hooks pivot between the open and closed positions.

16. The welding apparatus of claim 15 wherein the first cable management hook pivots around a pivot member.

17. The welding apparatus of claim 16 wherein the pivot member is a bolt.

18. The welding apparatus of claim 16 wherein the pivot member is a pin.

19. The welding apparatus of claim 10 wherein the first cable management hook remains in the closed position by way of a snap-in connection with the first recessed pocket.

20. The welding apparatus of claim 19 wherein the snap-in connection includes a detent in the first recessed pocket cooperating with a cavity in the first cable management hook.

21. A cable management system for a manufacturing apparatus comprising:
   a housing having a front panel and a rear panel;
   a plurality of recessed pockets integrated into the front panel and the rear panel; and
   a plurality of cable management hooks movably mounted to corresponding ones of the plurality of recessed pockets and having shapes complementary to the recessed pockets so as to be configured to move between respective open positions external to a shape of the housing and respective closed positions that are integrated with the shape of the housing, wherein the recessed pockets and the cable management hooks are positioned such that the cable management hooks are positioned on a same side of the housing and move in a same direction to the respective open positions.

* * * * *